May 5, 1970   H. MUTCHNIK ET AL   3,510,096
BRACKET MOUNTING FOR WOODEN FURNITURE LEGS
Filed Oct. 1, 1968   3 Sheets-Sheet 1
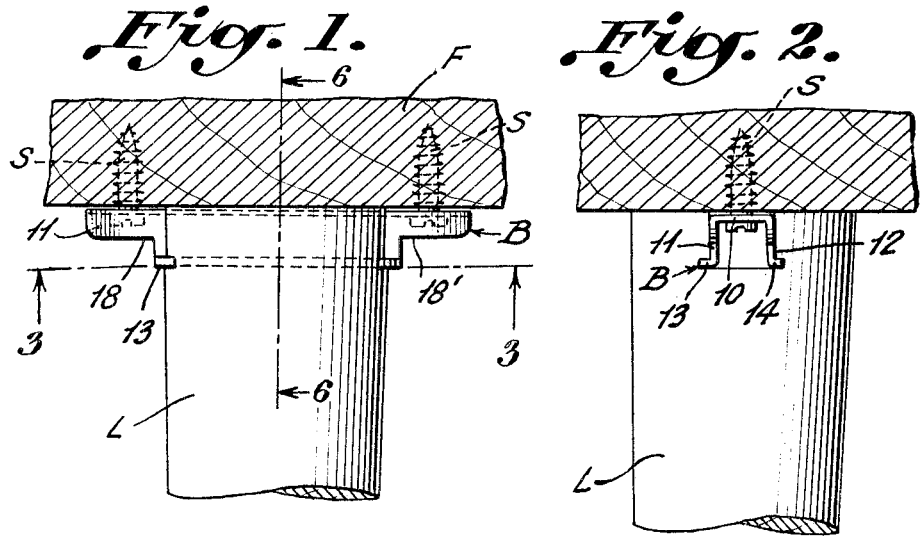
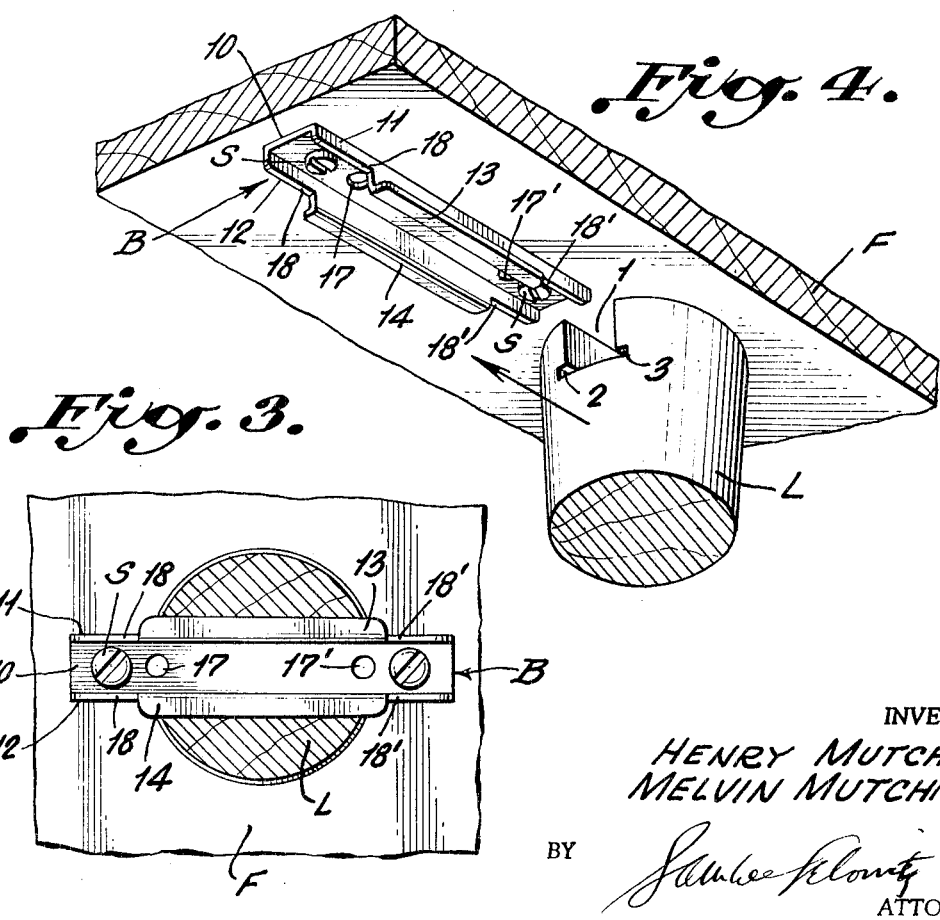
INVENTORS
HENRY MUTCHNIK
MELVIN MUTCHNIK
BY
ATTORNEY

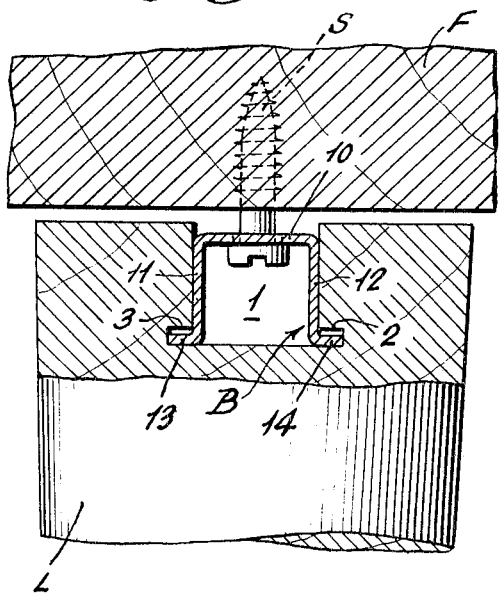
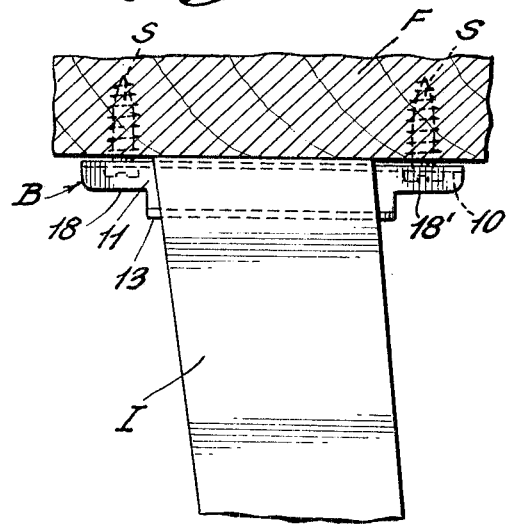
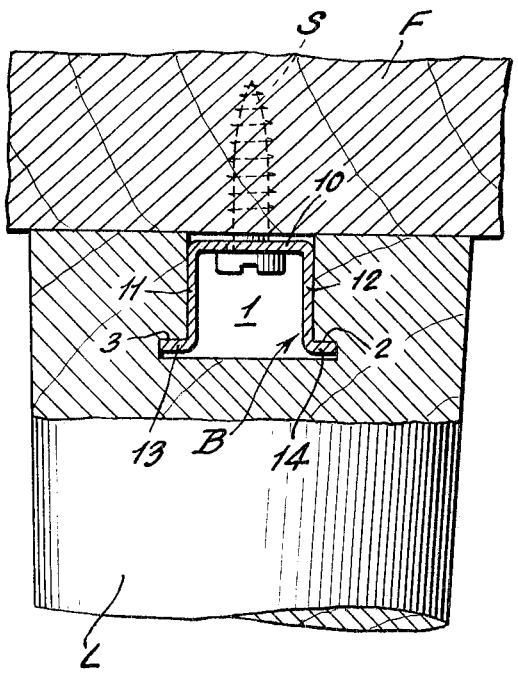
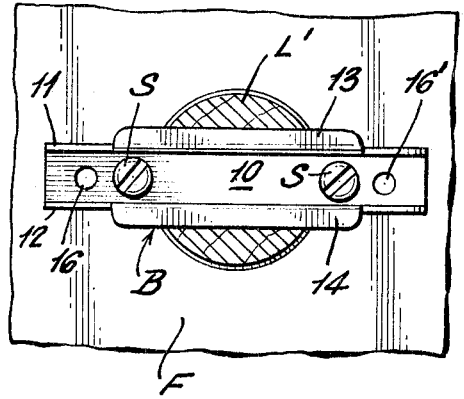
INVENTORS
HENRY MUTCHNIK
MELVIN MUTCHNIK

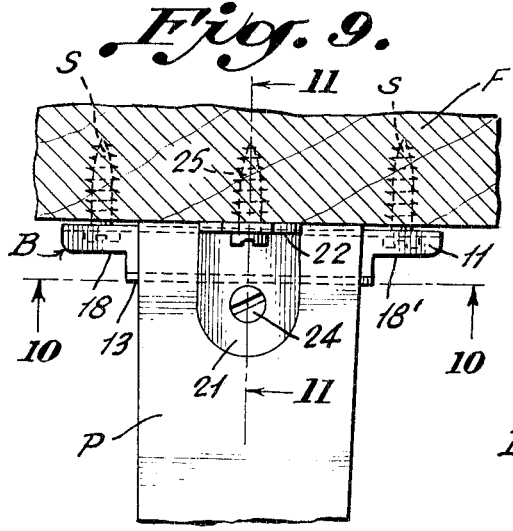
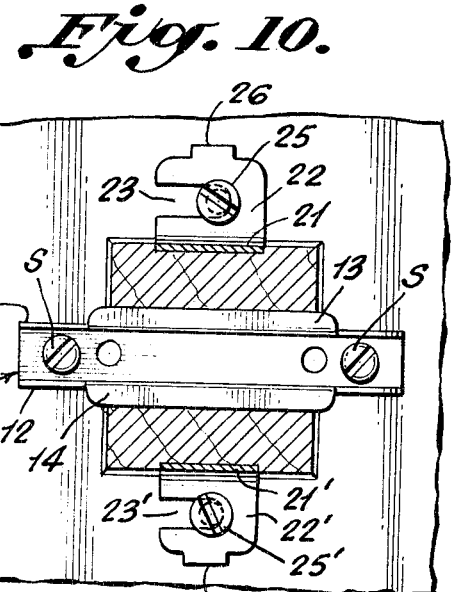
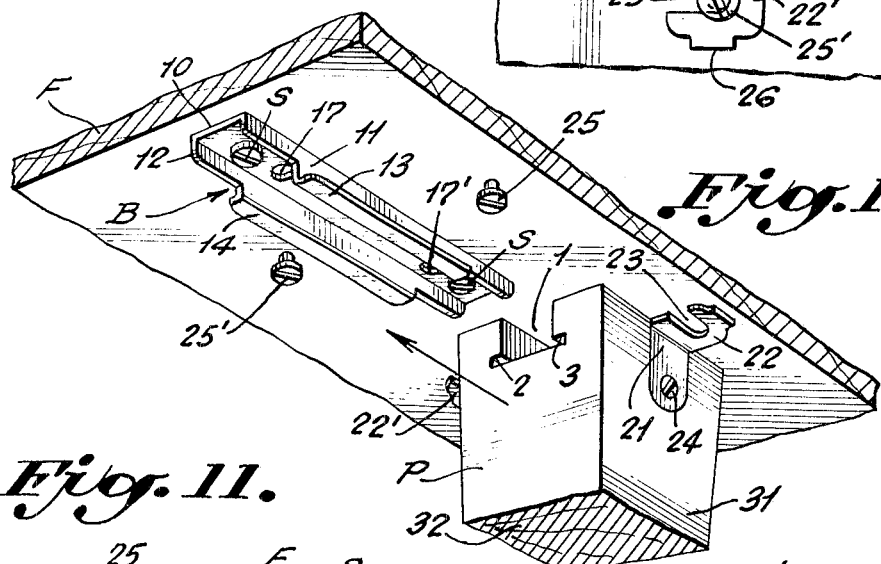
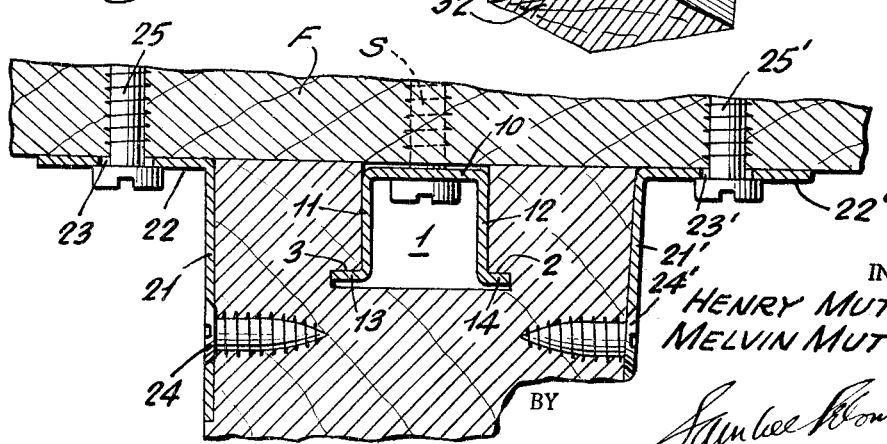

United States Patent Office 3,510,096
Patented May 5, 1970

3,510,096
BRACKET MOUNTING FOR WOODEN FURNITURE LEGS

Henry Mutchnik and Melvin Mutchnik, both of 5804 Gist Ave., Baltimore, Md. 21215
Filed Oct. 1, 1968, Ser. No. 764,283
Int. Cl. F16m 11/16
U.S. Cl. 248—188                                    10 Claims

ABSTRACT OF THE DISCLOSURE

An elongate bracket assembly for rigidly mounting a wooden furniture leg fitted with a longitudinal slot of an inverted T in cross-section, adjacent to its upper end, said bracket having a central web, adapted initially to be affixed loosely to the underside of a furniture unit, and formed with lateral projections extending downwardly from at least the midportion of said web and terminating in outwardly directed flanges substantially parallel to the plane of the web with a displacement therefrom slightly less than the head of the T-slot from the end of the leg. The slotted leg is adapted to be slid onto the bracket so that the midportion of the bracket is accommodated within the stem of the T while the flanges are nested within the arms or horizontal grooved arms of the T, which upon the tightened fastening of the web towards the underside of the furniture unit results in clamping of the furniture leg thereonto by the action of the flanges against the upper surfaces of the horizontal grooves of the T-slot. When the wood legs are of polygonal section, additional bracing brackets may be provided at opposite lateral surfaces of the leg to supplement the action of the main fastening bracket.

---

It is the object of the present invention to provide a sheet metal bracket for affixing wooden legs to furniture units, which brackets may be fabricated at low cost, and which may serve to quickly and tightly mount wooden furniture legs of different contours to furniture units without need for skilled labor.

It is a further object of the invention to correlate a rugged mounting bracket for a wooden furniture leg with the end of the latter which is milled with an inverted T-slot, which is dimensioned relative to the bracket, so that the bracket may first be affixed loosely to the underside of the furniture unit, preparatory to the sliding of the furniture leg thereonto, and which upon the subsequent tightening of the bracket onto the underside of the furniture unit, results in a tight clamping of the leg to the furniture unit.

The bracket is well adapted to the mounting of legs of different cross-sections such as cylindrical, frusto-conical, rectangular, hexagonal, octagonal, etc., and the brackets may be easily adapted to legs of different dimensions, with a single bracket having the capability of securely mounting legs of different sizes. Furthermore, in the case of legs of rectangular or other polygonal section, the clamping action of the bracket may be supplemented by the use of additional bracing brackets on the opposite lateral adges of the legs.

Other objects and purposes will appear from the detailed description of the invention following hereinafter, taken in conjunction with the accompanying drawings wherein:

FIG. 1 is a front elevation of the upper end of a wooden leg affixed to the underside of a furniture unit by means of a bracket in accordance with the invention;

FIG. 2 is a right end view of FIG. 1;

FIG. 3 is a horizontal sectional view along line 3—3 of FIG. 1;

FIG. 4 is a perspective view of the mode of assembly of the slotted table leg with the bracket in accordance with the invention, which initially is loosely affixed to the furniture unit;

FIG. 5 is a transverse sectional view of the bracket and upper end of the table leg in the initial stages of the assembly of the parts, along line 6—6 of FIG. 1;

FIG. 6 is a vertical sectional view along line 6—6 of FIG. 1, showing the position of the parts in the finally assembled condition, subsequent to that shown in FIG. 5;

FIG. 7 is a horizontal sectional view along line 3—3 of FIG. 1 when a leg of smaller circular section is used;

FIG. 8 is a front elevation similar to FIG. 1 when a wooden leg of rectangular cross-section is used with a mounting thereof at an inclination to the vertical;

FIG. 9 is a front elevation, similar to FIG. 1, of another embodiment of the invention comprising a wooden leg of rectangular cross-section;

FIG. 10 is a horizontal sectional view along line 10—10 of FIG. 9;

FIG. 11 is a vertical sectional view along line 11—11 of FIG. 9; and

FIG. 12 is a perspective view of the mode of assembly of the slotted table leg shown in FIGS. 9 to 11.

In the drawings is shown a furniture unit F which may be a chair, table, or any other item of furniture, to the underside of which is adapted to be affixed a supporting leg L of any suitable length and shape.

The bracket B in accordance with the invention consists essentially of an elongated sheet metal channel formation embodying a central web 10 and projections 11 and 12 extending transversely therefrom in a downward direction. Flanges 13 and 14 extend transversely from the free ends of the projections 11 and 12, respectively, in a plane substantially parallel to the plane of web 10.

A pair of circular openings 16, 16' are provided adjacent to each end of the web for receiving screw fasteners S for affixing the bracket to the underside of the furniture unit. In order to facilitate the manipulation of the screw fasteners, the opposite ends of the projections of the bracket are notched at 18 and 18', respectively, which serve to shorten the depth of the projections 11 and 12 adjacent to the opposite ends, and which furthermore serve to shorten the length of the flanges 13 and 14, which extend from the free edges of the projections 11 and 12. In some cases it may be desirable to have projections 11 and 12 cut off completely adjacent to the opposite ends thereof.

The wooden table leg L is milled with a longitudinal slot at the end thereof, having a cross-section of an inverted T, which is designed to receive the bracket and clamp the end of the leg to the underside of the furniture unit. This T-slot, (FIG. 4), consists of a main vertical passage 1, adapted to embrace the exterior faces of the projections 11 and 12, which merges with horizontal grooves 2 and 3 and the base of the passage 1, which are adapted to engage the flanges 14 and 13, respectively, of the bracket. The depth of the vertical passage 1 at the end of the wooden leg is slightly greater than the height of the projections 11 and 12 which terminate in flanges 13 and 14, respectively.

As shown in FIG. 5, the wooden leg is assembled easily and quickly by loosely mounting the bracket B to the undersurface of the furniture unit F by means of the screw fasteners S, and in this condition the leg L is slid into engagement with the bracket, as illustrated in FIG. 4, to position the leg at substantially the midportion of the bracket so that the flanges 13 and 14 protrude at least slightly beyond the body of the leg, as shown in FIGS. 1 and 3. Thereafter, the fasteners S, which are easily accessible beyond the periphery of the leg L, are screwed in to advance the web 10 towards the undersurface of the furniture unit, as indicated in FIGS. 5 and 6, and in view of the dimensions of the bracket and the longitudinal slot in the table leg, the parts are brought to the position illustrated in FIG. 6 in which the flanges 13 and 14 act against the upper faces of the grooves 3 and 2, respectively, to clamp together tightly the juxtaposed surfaces of the leg and underside of the furniture unit.

Of course, the brackets may be fabricated in different sizes and from sheet metal of different gauges to render the same adaptable to furniture units and legs therefor having varying loading requirements. However, the bracket in accordance with the invention lends itself to the adaptability for mounting table legs of different sizes by the provision of additional openings in the web of the bracket to accommodate such legs of different sizes. Thus, in FIG. 7 is shown the bracket B provided with an additional pair of circular openings 17, 17' which are disposed inwardly of the circular openings 16, 16' so that when a leg L', of smaller cross-section than leg L is used, the same bracket may be employed for this purpose. In this case, the screw fasteners S are inserted into the openings 17, 17' rather than in openings 16, 16' as shown in FIG. 4, and following the loose mounting of the bracket to the underside of the furniture unit, the leg L' is slid onto the bracket at substantially the midportion of the latter, leaving the heads of the fasteners S exposed, as shown in FIG. 7, so that these fasteners may be screwed into the underside of the furniture unit to clamp tightly the end of the furniture leg to the furniture unit.

The exposure of the openings 16, 16' on the underside of the furniture unit are not visible in use, and do not affect the utility of the bracket to any substantially greater degree than in the case when the openings 17, 17' are covered by the end of the furniture leg when the leg is of larger dimension, as shown in FIGS. 1 to 6.

The legs which may be mounted on the brackets may assume different dimensions and contours and may also be mounted to the furniture unit at any desired angle to the vertical. Thus, in FIG. 8 is illustrated a leg I of rectangular cross-section in which the end of the leg is finished in a plane which is not perpendicular or normal to the longitudinal axis of the leg. The longitudinal slot in the latter is milled parallel to the end face thereof and the mode of assembly of the wooden leg thus constructed is the same as that indicated in FIG. 4, which, upon the ulimate tightening of the fastening screws S, results in a mounting as shown in FIG. 8.

As stated above, while the leg I in this figure is of rectangular cross-section, it may be circular, frusto-conical or polygonal in outline, having any desired number of faces.

The bracket in accordance with the invention lends itself admirably to the combination therewith of one or more lateral bracing members, especially in the case when legs of rectangular section are employed. Thus, in FIGS. 9 to 12 is shown an embodiment of the invention utilizing a leg P of rectangular cross-section which is adapted to cooperate with the bracket B, as described above. In addition to the clamping action attained by the interfitting of the flanges of the bracket with the T-slot at the end of the table, L-shaped braces may be affixed to the lateral faces of the table leg which extend in parallel to the longitudinal slot therein. The brace on one face of the table leg consists of an L-shaped bracket having a vertical plate 21 affixed to the side 31 of the table leg by means of screw fastener 24. This plate may be mortised within the face 31 of the table leg to impart a finished appearance thereto. A horizontal plate 22 extends outwardly in a perpendicular direction from the plate 21 and is provided with an open slot 23 therein. Preferably, another L-shaped bracket is mounted on the opposite face of the leg having a vertical plate 21' affixed to the side of the leg 32, with an integral horizontal extension 22' extending transversely therefrom in a plane coincident with the end surface of the table leg, and also fitted with an open slot 23'.

Fastening screws 25 and 25' are mounted partially within the underside of the furniture unit at approximately the midportion of the mounting bracket and these are disposed in alignment with the open-ended slots 23 and 23', respectively, so that following the rectilinear movement of the leg P into engagement with the bracket B, as indicated by the arrow in FIG. 12, the horizontal plates 22 and 22' slide into the spaces between the heads 25 and 25' and the underside of the furniture unit. Following the ultimate clamping of the leg to the furniture unit by the final screwing of the fastening screws S at the end of the bracket B, the fastening screws 25 and 25' are brought into tight engagement with the external surfaces of horizontal clamping plates 22 and 22' to impart great lateral stability to the table leg, with the use of only little additional hardware which is hardly visible in the complete assembly.

The bracing elements 21, 22 and 21', 22' may be stamped integrally in the form of U-shaped stampings and separated into right and left units at their junction lines 26 following their fabrication, and preparatory to the assembly thereof with the opposite faces of the table legs.

It is understood that the bracing elements shown in FIGS. 9 to 12 may be applied to table legs of different cross-section other than rectangular, for example, these may be applied as well to the opposite faces of table legs of hexagonal and octagonal cross-section. Furthermore, when the faces of the table legs to which the bracing members are applied are of relatively large dimensions, more than one bracing element may be applied to each face to increase the stability of the leg.

While we have described our invention as particularly applicable to bracket mountings for wooden furniture legs in view of the milled slot which is formed therein being a common woodworking operation, it is understood that the invention is applicable as well to furniture legs of other materials, such as plastic, composite materials of plastic and fillers, for example, wood chips, fibers, etc., and even metal which is formed with a solid portion at the upper end thereof.

We claim:
1. A device for mounting a furniture leg to the underside of a furniture unit comprising
   (a) an elongated bracket member having a central web with lateral projections extending transversely and downwardly from at least the midportion of the opposite longitudinal edges thereof,
   (b) said projections terminating in transversely disposed retaining flanges extending outwardly beyond the longiutdinal edges of said central web,
   (c) said bracket adapted to engage the end of a leg fitted with a longitudinal slot adapted to embrace said projections and with transverse grooves at the base of said slot adapted to receive said transversely disposed flanges,
   (d) said central web having an opening at each end thereof for receiving a fastener to affix said bracket to the underside of said unit,
   (e) the distance between the end surface of said leg and the grooves therein being slightly more than the distance between the web of said bracket and said retaining flanges, so that the clamping of the web of the bracket to the underside of the furniture unit by the fasteners, results in the clamping of the end surface of the leg thereto, in consequence of the action of said retaining flanges on the upper faces of said transverse grooves.

2. A device as set forth in claim 1 wherein said transversely disposed retaining flanges are in a plane substantially parallel to said central web with the plane of the transverse grooves in the leg substantially coincident therewith.

3. A device as set forth in claim 2, wherein said projections are truncated at least partially adjacent to each end of the bracket to facilitate the handling of the fasteners within the openings at the ends of the bracket.

4. A device as set forth in claim 2, wherein said bracket is provided with more than one opening at each end thereof to accommodate furniture legs of different cross-sections, thereby to expose at least one pair of openings beyond the cross-section of the end of the mounted leg, for fastening the bracket tightly to the underside of the furniture unit.

5. A device as set forth in claim 2, wherein the end of the furniture leg is in a plane disposed at an angle other than normal relative to the longitudinal axis of the leg, thereby to dispose the leg at a corresponding inclination from the perpendicular relative to the underside of the furniture unit.

6. A device as set forth in claim 2 wherein the furniture leg is of circular cross-section.

7. A device as set forth in claim 2 wherein the furniture leg is of rectagular cross-section.

8. A device as set forth in claim 2 wherein said projections are notched and of reduced depth adjacent to each end thereof, whereby the projects at the midportion thereof and the retaining flanges extending therefrom are shorter than the web but longer than the longitudinal slot in the leg.

9. A device as set forth in claim 2 wherein the leg is of polygonal section, including a unitary clamping member having one arm affixed to the lateral side of one face of said leg parallel to the axis of the longitudinal slot therein, and a second arm integral therewith extending outwardly therefrom in the plane of the end of the leg, with an opening therein for receiving a screw fastener to affix the clamping member to the underside of the furniture unit.

10. A device as set forth in claim 9 wherein a clamping member is affixed to opposite lateral sides of the leg to stabilize the mounting thereof, and the opening in the second arm of each is formed as an open-ended slot adapted to be moved into engagement with the screw fastener, which is adapted to be loosely mounted in the underside of the furniture unit, between the latter and the head of the screw fastener, preparatory to the tightened fastening of the latter against said second arm.

References Cited

UNITED STATES PATENTS

| | | | |
|---|---|---|---|
| 515,382 | 2/1894 | Vankirk et al. | 248—188 |
| 2,094,486 | 9/1937 | Cohen | 248—188 |
| 2,793,407 | 5/1957 | Johnston | 287—20.924 |
| 3,190,598 | 6/1965 | Wilf | 248—188 |
| 3,409,258 | 11/1968 | Carlson | 248—188 |

MARION PARSONS, Jr., Primary Examiner

U.S. Cl. X.R.

287—20

UNITED STATES PATENT OFFICE
CERTIFICATE OF CORRECTION

Patent No. 3,510,096            Dated May 5, 1970

Inventor(s) HENRY MUTCHNIK and MELVIN MUTCHNIK

It is certified that error appears in the above-identified patent and that said Letters Patent are hereby corrected as shown below:

Claim 8, column 5, line 24, "projects" should be --projections--.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents